(No Model.)
W. V. PAYNE.
PLANTER ATTACHMENT FOR PLOWS.
No. 552,923. Patented Jan. 14, 1896.
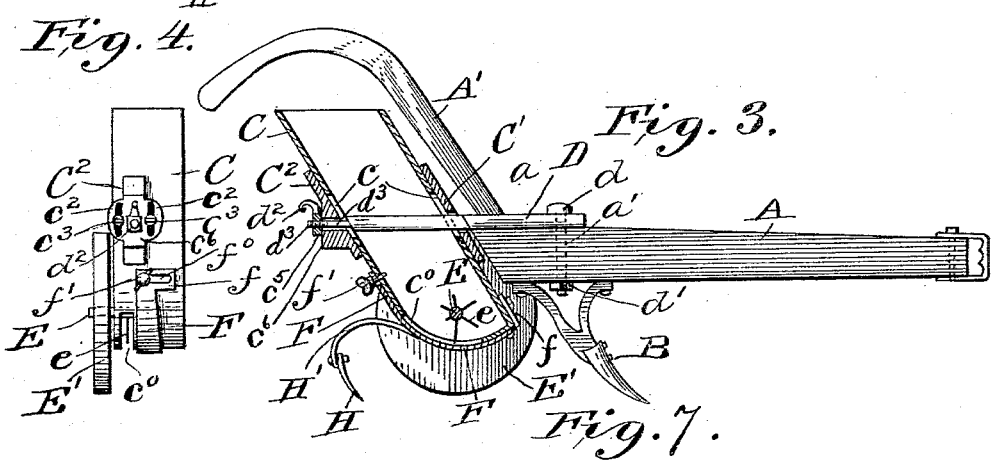
Witnesses
Jas. H. Blackwood
Albert B. Blackwood.
Inventor
William V. Payne,
by Whitman & Wilkinson
Attorneys

UNITED STATES PATENT OFFICE.

WILLIAM V. PAYNE, OF CHAPPELLS, SOUTH CAROLINA.

PLANTER ATTACHMENT FOR PLOWS.

SPECIFICATION forming part of Letters Patent No. 552,923, dated January 14, 1896.

Application filed May 22, 1895. Serial No. 550,252. (No model.)

*To all whom it may concern:*

Be it known that I, WILLIAM V. PAYNE, a citizen of the United States, residing at Chappells, in the county of Newberry and State of South Carolina, have invented certain new and useful Improvements in Cotton-Planter and Fertilizer-Distributer Attachments for Plows; and I do hereby declare the following to be a full, clear, and exact description of the invention, such as will enable others skilled in the art to which it appertains to make and use the same.

My invention relates to improvements in cotton-seed planters and guano-distributers; and it consists of a detachable device adapted to be connected to any ordinary plow-beam and comprising a novel combination and arrangement of parts to be hereinafter described and claimed.

Reference is had to the accompanying drawings, in which the same parts are indicated by the same letters throughout the several views.

Figure 1 represents a side elevation of a shovel-plow of ordinary construction, the beam of which is perforated for the purpose of attaching thereto my improved device. Fig. 2 represents a side elevation of the same plow shown in Fig. 1 after my improved device has been attached thereto. Fig. 3 represents a section through the center of the detachable device shown in Fig. 2 while attached to the plow-beam. Fig. 4 represents a rear view of the detachable device as detached from the plow, but the coverers are omitted for the better illustration of the base of the hopper. Fig. 5 represents in detail the bar and means for connecting the same to the hopper and the plow-beam, which bar supports the said hopper in position. Fig. 6 represents a plan view of the bar shown in side elevation in Fig. 5, and Fig. 7 represents one of the adjustable plates clamped to the face of the hopper to form a bearing for the bar shown in Figs. 5 and 6.

A represents the plow-beam provided with a perforation $a'$. This beam carries a plow B of any desired or suitable construction, and is also provided with handles $A'$.

The rear of the plow-beam is sloped backward, as at $a$, and against which abuts one of the adjustable bearing-plates secured to the hopper C. The front bearing-plate $C'$ is provided with an angular perforation $c^0$ to receive the reduced portion $d^0$ of the bar D, and the said plate covers the vertical slot $c^0$ in the front side of the hopper C. It is adjusted in position by means of the screws $c^3$, which pass through the slots $c^2$. The rear end of this bar D is reduced, as at $d^3$, and is screw-threaded to engage the hand-nut $d^2$. This bar has the said reduced portion $d^3$ projecting through the rear slot $c$ of the hopper and through the aperture $c^5$ in the rear block $C^2$, which is provided with a flat face $c^6$, against which the hand-nut $d^2$ engages. Thus it will be seen that the said hopper may be raised or lowered relative to the said bar, and may be clamped in position at such a height as may be desired. The hopper may also be steadied by means of a hook G, engaging in one of the eyes $a^2$, as shown in Figs. 1 and 2.

To the base of the hopper, which is provided with a slot $c^0$, an adjustable plate F is attached, as by means of the clamp-screws $f'$ passing in the slot $f^0$ in the laterally-extending heads $f$, as shown most clearly in Fig. 4. This plate F may be adjusted by means of the said clamp-screw $f'$ to cover the whole of the slot $c^0$ or only a portion thereof, as may be desired, and thus the delivery of seed or fertilizer may be regulated at will.

Transversely in the hopper C is mounted a shaft E, which is provided with a series of stirring-arms $e$, the longest of which projects into the slot $c^0$, as shown in Figs. 3 and 4. This shaft E is rotated by means of the wheel $E'$, which runs in the furrow in rear of the plow B.

The seed and fertilizer are covered up by the coverers H attached to the resilient arms $H'$, which are attached to the base of the hopper C in any convenient way.

It will be obvious that if the bolt $d$, which fastens the bar D to the plow-beam, be removed, which can readily be done by unscrewing the nut $d'$, then the entire seed-planting and fertilizer-distributing apparatus may be detached from the plow at one operation.

These and the various other advantages of the herein-described construction will readily suggest themselves to any one skilled in the art.

Having thus described my invention, what

I claim, and desire to secure by Letters Patent of the United States, is—

1. In a seed planting attachment for plows, the combination with a hopper provided at its lower end with seed distributing and seed covering devices, and having a slot through its forward wall and a similar slot through its rear wall, of a metal bar provided at one end with a reduced portion and screw threaded to receive a nut, and having a perforation through its opposite end to receive a bolt, the reduced end of said bar being adapted to pass through the slots in the forward and rear walls of the hopper and be secured by a nut, and the other end of said bar being adapted to be attached to the upper side of the plow beam for supporting the hopper, by means of a bolt passing through the perforation therein and through a perforation in the beam of the plow, substantially as and for the purposes described.

2. In a seed planting attachment for plows, the combination with a hopper provided at its lower end with seed distributing and seed covering devices, and having a slot through its forward wall and a similar slot through its rear wall, of a metal bar provided at one end with a reduced portion and screwthreaded to receive a nut, and having a perforation through its opposite end to receive a bolt, the reduced end of said bar being adapted to pass through the slots in the forward and rear walls of the hopper and be secured by a nut, and the other end of said bar being adapted to be attached to the upper side of the plow beam for supporting the hopper, by means of a bolt passing through the perforation therein and through a perforation in the beam of the plow; and means for securing the said bar at different positions in said slots for the purpose of holding said hopper in a higher or lower position relative to said bar, substantially as and for the purposes described.

3. In a seed planting attachment for plows, the combination with a hopper provided at its lower end with seed distributing and seed covering devices, and having a slot through its forward wall and a similar slot through its rear wall, perforated plates vertically adjustable over said slots and secured by set screws; of a metal bar provided at one end with a reduced portion and screwthreaded to receive a nut, and having a perforation through its opposite end to receive a bolt, the reduced end of said bar being adapted to pass through the perforations in said plates and through said slots and be adjusted vertically in said slots and secured therein by means of said plates, and secured by a nut upon its rear end, and the forward end of said bar being adapted to be attached to the beam of the plow by means of a bolt passing through the perforation therein and through a perforation in the beam of the plow; substantially as and for the purposes described.

4. The combination with a plow beam of the character described, provided with a perforation adapted to receive a bolt near its rear end; of a seed hopper provided with an opening in its lower end for the escape of the seed, and means for regulating the flow of seed therethrough, and devices for covering the seed, carried by said hopper; the said seed hopper being detachably connected to said plow beam by means of a metal bar passing through vertical slots in the front and rear walls of said hopper, and secured by means of a nut upon its rear end, and adjustable vertically in said slots, and attached at its forward end by means of a bolt to the beam of the plow, substantially as and for the purposes described.

In testimony whereof I affix my signature in presence of two witnesses.

WILLIAM V. PAYNE.

Witnesses:
W. R. SMITH,
S. G. CARTER.